W. A. FRAZER.
AUTOMOBILE STEERING COLUMN.
APPLICATION FILED NOV. 4, 1913.
1,145,761.
Patented July 6, 1915.
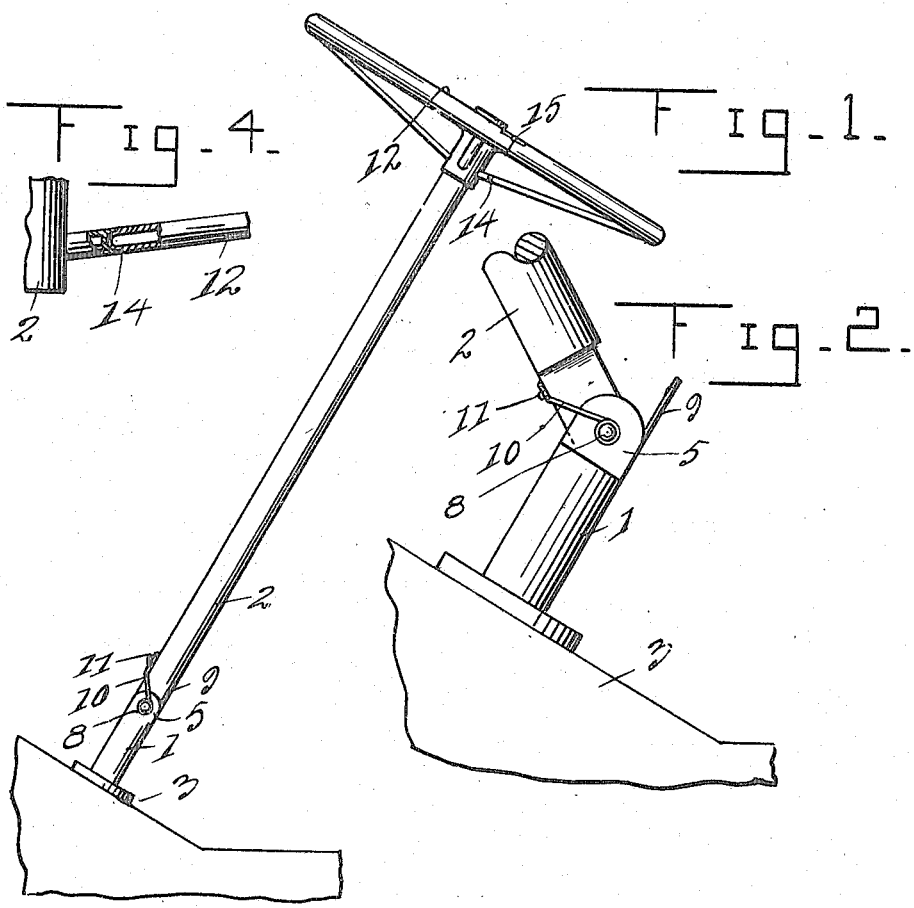
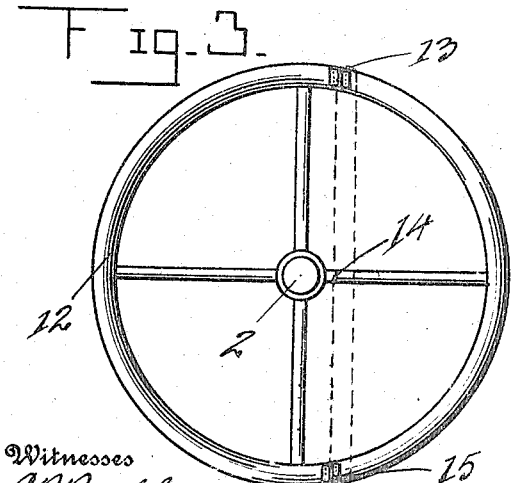
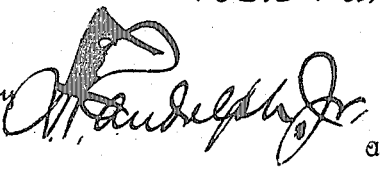

UNITED STATES PATENT OFFICE.

WILLIAM A. FRAZER, OF LOS ANGELES, CALIFORNIA.

AUTOMOBILE STEERING-COLUMN.

1,145,761.  Specification of Letters Patent.  Patented July 6, 1915.

Application filed November 4, 1913. Serial No. 799,170.

*To all whom it may concern:*

Be it known that I, WILLIAM A. FRAZER, a citizen of the United States, residing at Los Angeles, in the county of Los Angeles and State of California, have invented certain new and useful Improvements in Automobile Steering-Columns; and I do hereby declare the following to be a full, clear, and exact description of the invention, such as will enable others skilled in the art to which it appertains to make and use the same.

This invention relates to new and useful improvements in adjustable steering columns for automobiles and its principal object aims to provide a device of this character which may be readily manipulated to allow the driver of the automobile to enter or leave the vehicle without the usual inconvenience attendant upon the entering and leaving of a car equipped with the customary steering column.

A further object is to construct the steering column with regard to proportion, number and arrangement of parts, that it may be cheaply manufactured, and which may be readily applied to any standard make of automobile.

An object of equal importance with the foregoing is to provide means for normally holding the elements of the steering column in rigid operable position.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is an elevation illustrating the steering column of this invention in assembled position on the floor of an automobile. Fig. 2 is a detail view illustrating the two portions of the steering column in the position which they assume when manipulated to allow the entrance or exit of the operator from the automobile. Fig. 3 is a top view illustrating in detail the preferred form of steering wheel employed in connection with the steering column of this invention. Fig. 4 is a detail sectional view of the spoke joint employed in the preferred form of steering wheel.

Proceeding now to the description of the drawings the numerals 1 and 2 designate respectively the upper and lower sections of the steering column. The two sections of 1 and 2 of this column are pivotally connected as will be hereinafter fully described. The member 1 is stationary and is fixed to the floor of the machine in the usual manner as indicated at 3. The upper section 2 is designed to be swung into and out of alinement with the section 1 for the purpose above set forth. The hinge by which the sections 1 and 2 are connected, which is illustrated in detail in Figs. 2 and 5, includes a pair of apertured ears 4 and 5 formed integrally with the member 1 and extending upwardly therefrom and in parallel spaced relation. The section 2 is formed with a reduced lower terminal which is provided with the diametrically opposed apertures 6 and 7, which in the assembled position of the two sections are arranged to register with the apertures of the members 4 and 5 to permit the insertion of a pivot pin 8. It will thus be seen that the upper section of the steering column may be swung to dispose the steering wheel out of the way when the operator desires to enter or leave the automobile.

As a means for limiting the movement of the upper section of the steering column and for normally holding it in rigid operative position this invention employs a stop lip 9 which is semi-cylindrical in shape and is preferably formed integrally with the member 1, being disposed at the rear face thereof. By reference to Fig. 1 it will be observed that the member 2 when in alinement with the member 1 is arranged to bear against the lip 9. As a means, therefore, for normally holding the member 2 in this position a spring 10 has been provided. This spring is of the ordinary spiral type and is wound about the projecting terminal of the member 8, having one terminal secured thereto. The other terminal of the spring 10 is secured as at 11 to the member 2. From the foregoing it will be readily apparent that when the member 2 is swung on its pivot the motion will be against the tension of the spring 10 which will, when the steering wheel is released, act to force the section 2 back into engagement with the stop lip 9.

The preferred form of steering wheel employed with the steering column of this invention is designed to be folded as will be observed by reference to Fig. 3. In order to permit the folding of this preferred form of steering wheel designated as an entirety in Fig. 3 the invention employs the hinges 13, 14 and 15 which are interposed in one spoke of the steering wheel and at two alined points in the wheel body.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction proportion and arrangement of parts may be resorted to when required, without sacrificing any of the advantages of my invention, as defined in the appended claim.

What is claimed is:

The combination of an automobile with an adjustable steering column including a stationary lower section, a pair of perforate spaced ears formed integrally therewith and projecting upwardly therefrom, a stop lip formed integrally with said stationary section, an upper movable section, a reduced tubular member formed in the lower terminal of said upper section, said tubular member being provided with diametrically opposed apertures, a pivot pin adapted to be inserted through the said apertured ears and said apertures of said reduced tubular member for pivotally connecting the said stationary and movable sections, a spring secured to said pivot pin and disposed to bear against said movable section for normally holding said movable section in engagement with said stop lip and in longitudinal alinement with said stationary section, and a foldable steering wheel mounted on the upper terminal of said movable section.

In testimony whereof I affix my signature in presence of two witnesses.

WILLIAM A. FRAZER.

Witnesses:
J. C. HOIRS,
C. F. KEMPER.